G. WYSKWARKO.
TRAP.
APPLICATION FILED APR. 1, 1920.

1,407,909.

Patented Feb. 28, 1922.

INVENTOR.
Gregorey Wyskwarko
BY
George C. Henricks
ATTORNEY.

UNITED STATES PATENT OFFICE.

GREGOREY WYSKWARKO, OF CHICAGO, ILLINOIS.

TRAP.

1,407,909.   Specification of Letters Patent.   Patented Feb. 28, 1922.

Application filed April 1, 1920. Serial No. 370,487.

*To all whom it may concern:*

Be it known that I, GREGOREY WYSKWARKO, a citizen of Russia, residing at Chicago, county of Cook, and State of Illinois, have invented certain new and useful Improvements in Traps, of which the following is a specification.

This invention relates to animal traps, having more particular reference to traps of the type comprising a cage or box the door of which is held open by a latch or trigger to which is attached suitable bait.

The invention has for an object to produce a novel trap of this kind provided with a device whereby the animal caught may be dispatched if desired while in the trap.

For further comprehension of the invention, and of the objects and advantages thereof, reference will be had to the following description and accompanying drawings, and to the appended claims in which the various novel features of the invention are more particularly set forth.

Figure 1:
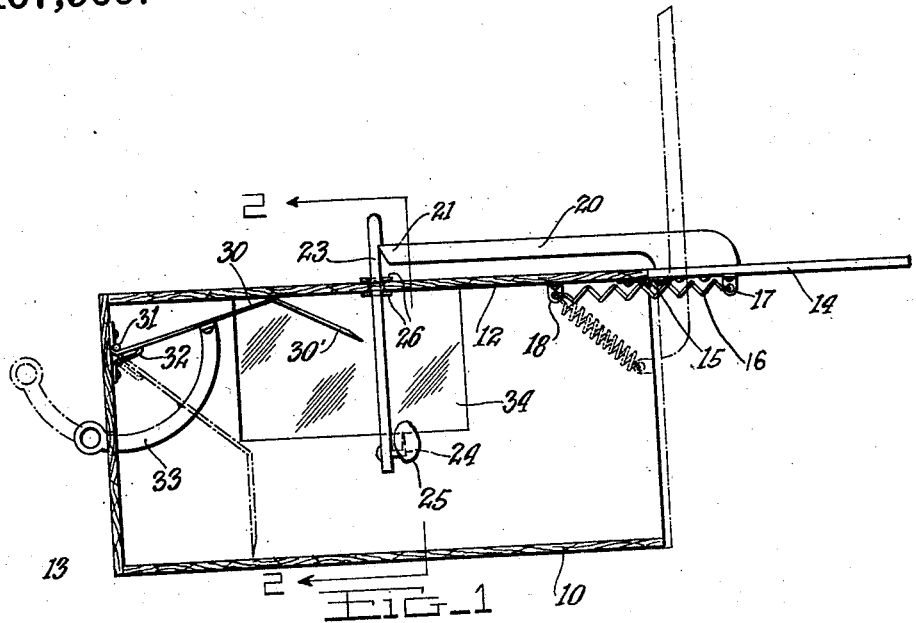

Fig. 1 of the drawings is a longitudinal vertical sectional view of an animal trap constructed according to my invention.

Figure 2:
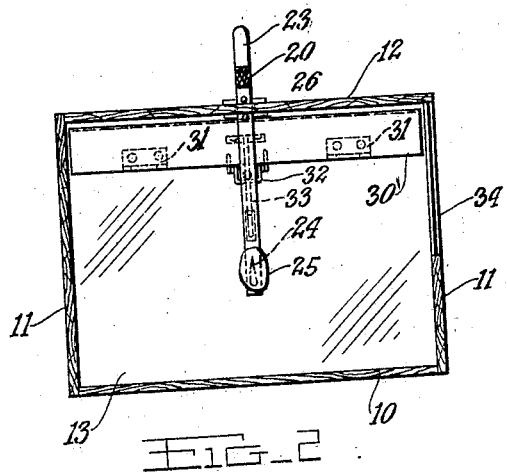

Fig. 2 is a transverse section on the line 2—2 of Fig. 1.

As here shown my improved trap comprises a box made up of a bottom 10, side walls 11, a top 12 and end walls 13 and 14 the latter of which is in the form of an entrance door hinged at its upper edge as at 15 to the top of the box. A tension spring 16 secured at one end to an eye 17 on the door 14 and at its opposite end to a similar eye 18 on the underside of the top 12 holds the door closed when the trap has been sprung.

The means by which the door is held in its raised or open position comprises an arm 20 fixed to the door and extending parallel thereto, this arm projecting backwardly over the top of the box and having a toothed end 21 which engages under a downwardly facing shoulder formed on a latch arm 23 which extends downwardly through a suitable aperture in the top 12 and is provided with a hook 24 on its lower end adapted to have a piece of meat, or other suitable bait 25 placed thereon. This latch arm is preferably located substantially midway between opposite ends of the box and may be conveniently fulcrumed in the top 12 by means of a pair of pins 26 carried thereby and projecting respectively over the outer and inner surfaces of the top 12.

In connection with my improved trap, I provide a knife whereby the head of the animal may be severed from its body. This knife consists of a bent blade 30 extending substantially across the trap in close proximity to the latch arm 23. The blade 30 is hinged as at 31 on the end wall 13 of the box near the top thereof, this knife being normally pressed upwardly against the top of the box by means of a flat spring 32 fixed on the end wall 13 under and adjacent the knife and pressing upwardly against the latter. Secured to this knife to operate the same is an arcuate handle 33 curved concentric to the hinge 31 of the knife and extending through a suitable slot in the end wall 13 of the trap. As indicated clearly by the dot and dash lines in Fig. 1 the downwardly bent front or cutting portion 30′ of the knife 30 is extended at such an angle as to assume an approximately vertical position when swung to the bottom of the box. To enable the position of the animal in the trap to be ascertained, a window 34 is formed in one of the side walls 11 in juxtaposition to the cutting edge of the knife 30.

It is believed that the manner of use of my improved trap will be obvious from the above description, it being apparent that when the animal enters the trap and siezes the bait 25 the latch arm 23 will move away from the end 21 of the arm 20 and the spring 16 will close the door 14. The animal then may be killed by pulling on the handle 33 and swinging the knife 30 downward.

Having thus described my invention what I claim as new and desire to protect by Letters Patent of the United States is as follows:

1. A trap comprising a box having a door at one end, a knife hingedly secured in said box, and an arcuate handle curved concentric to the knife hinge and operable from the exterior of the said box for operating said knife, for the purpose set forth.

2. A trap comprising a box, a door on one end of said box, a latch in said box approximately midway between opposite ends thereof controlling said door, a knife blade hinged to the end of said box opposite said door, said knife having its cutting edge extending substantially from side to side of said box in proximity to the said latch, a spring normally pressing said knife upward, and an arcuate arm fixed to said knife and extending outside the said box, said box having a window therein, for the purpose set forth.

In testimony whereof I have affixed my signature.

GREGOREY WYSKWARKO.